United States Patent
Tokito et al.

(10) Patent No.: US 10,423,543 B2
(45) Date of Patent: Sep. 24, 2019

(54) INPUT/OUTPUT RESPONSE CONTROL SETTING DEVICE

(71) Applicant: Mitsubishi Electric Corporation, Chiyoda-ku (JP)

(72) Inventors: Hiroshi Tokito, Chiyoda-ku (JP); Hideaki Minamide, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 532 days.

(21) Appl. No.: 14/420,776

(22) PCT Filed: Aug. 6, 2013

(86) PCT No.: PCT/JP2013/071240
§ 371 (c)(1),
(2) Date: Feb. 10, 2015

(87) PCT Pub. No.: WO2014/038334
PCT Pub. Date: Mar. 13, 2014

(65) Prior Publication Data
US 2015/0234753 A1    Aug. 20, 2015

(30) Foreign Application Priority Data

Sep. 5, 2012  (JP) ................................. 2012-195103

(51) Int. Cl.
*G06F 13/10* (2006.01)
*G06F 13/22* (2006.01)
(Continued)

(52) U.S. Cl.
CPC ......... *G06F 13/102* (2013.01); *G05B 19/054* (2013.01); *G06F 13/225* (2013.01);
(Continued)

(58) Field of Classification Search
CPC . G06F 3/00; G06F 15/16; G06F 12/00; G06F 13/00; G06F 13/102; G06F 13/225; G05B 19/18
(Continued)

(56) References Cited

U.S. PATENT DOCUMENTS

| 2002/0016792 A1* | 2/2002 | Ito ......................... G06F 3/0601 |
| 2002/0095534 A1* | 7/2002 | Bae ........................ G09G 5/006 |
| | | 710/16 |

(Continued)

FOREIGN PATENT DOCUMENTS

| JP | 59-218507 A | 12/1984 |
| JP | 07-319515 A | 12/1995 |

(Continued)

OTHER PUBLICATIONS

International Search Report dated Sep. 10, 2013 in PCT/JP2013/071240 Filed Aug. 6, 2013.

*Primary Examiner* — Getente A Yimer
(74) *Attorney, Agent, or Firm* — Oblon, McClelland, Maier & Neustadt, L.L.P.

(57) ABSTRACT

An input/output response relation data storage 5 stores input/output response relations which are inputted by the user and in each of which an I/O station for input and an I/O station for output are defined. For input/output response relations in each of which the I/O station for input differs from the I/O station for output and each of which needs communications between the I/O stations, an interchange searcher 9 searches for an interchange candidate with which to make the I/O station for input and the I/O station for output be the same as a result of interchanging either of the I/O station for input and the I/O station for output with another I/O station, an interchanger 10 performs an interchange, and a display 3 displays a result of the interchange.

8 Claims, 11 Drawing Sheets

(51) Int. Cl.
*G05B 19/05* (2006.01)
*G06F 12/00* (2006.01)
*G06F 13/00* (2006.01)

(52) U.S. Cl.
CPC ...... *G05B 2219/1138* (2013.01); *G06F 12/00* (2013.01); *G06F 13/00* (2013.01)

(58) Field of Classification Search
USPC .......................................................... 710/8
See application file for complete search history.

(56) References Cited

U.S. PATENT DOCUMENTS

| | | | | |
|---|---|---|---|---|
| 2005/0015545 | A1* | 1/2005 | Liu | G06F 3/0607 711/114 |
| 2007/0248017 | A1* | 10/2007 | Hinata | G06F 3/061 370/238 |
| 2008/0040911 | A1* | 2/2008 | De Koning | G05B 19/41825 483/1 |
| 2008/0208361 | A1* | 8/2008 | Grgic | G05B 19/41865 700/2 |
| 2008/0313362 | A1* | 12/2008 | Takamoto | G06F 11/2017 710/19 |
| 2010/0211373 | A1* | 8/2010 | Kukreja | G06F 17/5027 703/14 |
| 2011/0102136 | A1* | 5/2011 | Nakashima | G06F 1/263 340/5.8 |
| 2013/0003754 | A1* | 1/2013 | Blumenroether | G08C 19/00 370/431 |
| 2015/0025656 | A1 | 1/2015 | Ono et al. | |

FOREIGN PATENT DOCUMENTS

| | | |
|---|---|---|
| JP | 10-320019 A | 12/1998 |
| JP | 2000-284812 A | 10/2000 |
| JP | 2003-177978 A | 6/2003 |
| JP | 2005-038251 A | 2/2005 |
| JP | 3887989 B2 | 2/2007 |
| JP | 2009-042913 A | 2/2009 |
| JP | 2013-161106 A | 8/2013 |

* cited by examiner

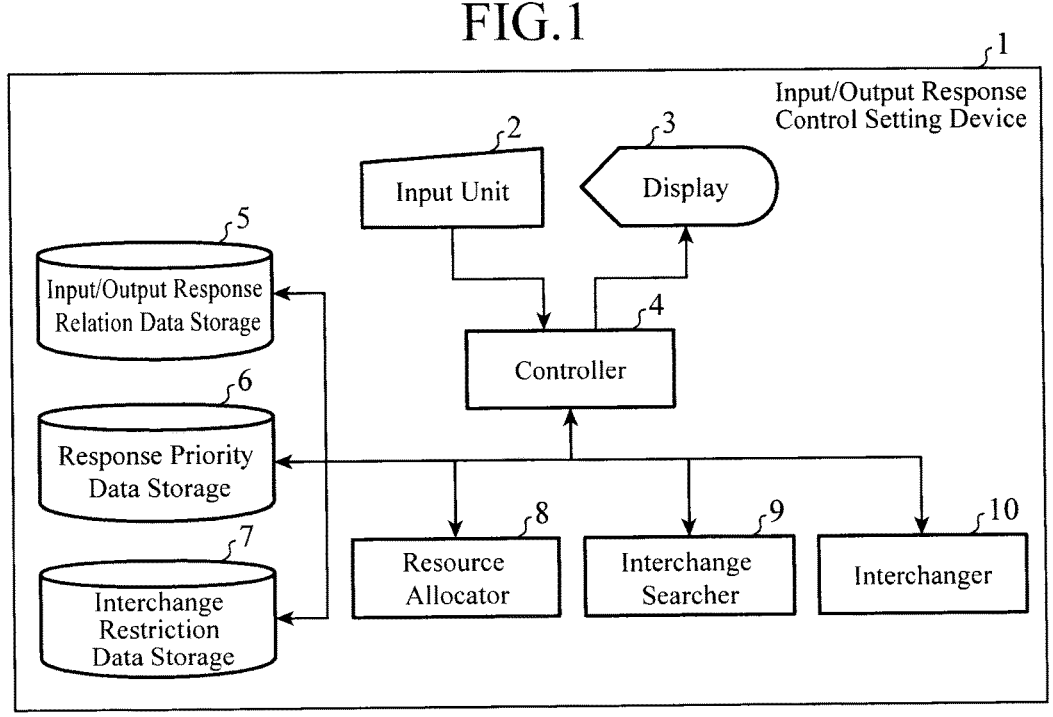

FIG.3

| No | Input A | | Input B | | Output C | | Operation | Response Priority |
|---|---|---|---|---|---|---|---|---|
| | Station Number | Device Name | Station Number | Device Name | Station Number | Device Name | | |
| 1 | 1 | 1 | | | 1 | 10 | OUT ▼ | 1 ▼ |
| 2 | 1 | 3 | 1 | 5 | 2 | 10 | OR ▼ | 2 ▼ |
| 3 | 2 | 1 | 1 | 4 | 3 | 10 | AND ▼ | 2 ▼ |
| 4 | 1 | 2 | | | 3 | 15 | MOV ▼ | 2 ▼ |
| 5 | 3 | 1 | | | 3 | 20 | OUT ▼ | 2 ▼ |

| Uninterchangeable Device | |
|---|---|
| Station Number | Device Name |
| 1 | 1 |
| 2 | 10 |
| | |

FIG.6
| No | Input A | | Input B | | Output C | | Operation | Response Priority |
|---|---|---|---|---|---|---|---|---|
| | Station Number | Device Name | Station Number | Device Name | Station Number | Device Name | | |
| 1 | 1 | 1 | | | 1 | 10 | OUT ▼ | 1 ▼ |
| 2 | *2* | 3 | *2* | 5 | 2 | 10 | OR ▼ | 2 ▼ |
| 3 | *1* | *5* | 1 | 4 | *1* | *15* | AND ▼ | 2 ▼ |
| 4 | *3* | 2 | | | 3 | 15 | MOV ▼ | 2 ▼ |
| 5 | 3 | 1 | | | 3 | 20 | OUT ▼ | 2 ▼ |
FIG.7
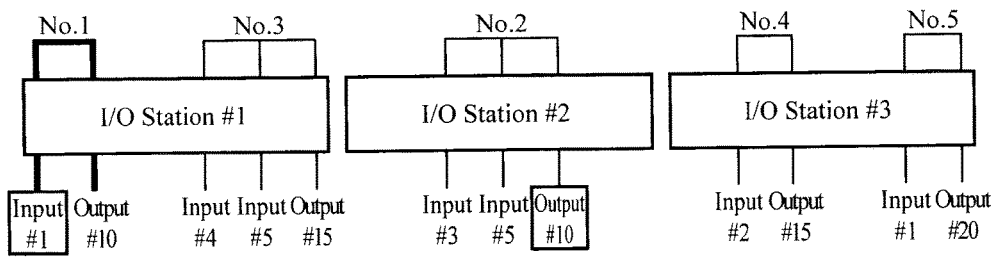
FIG.8
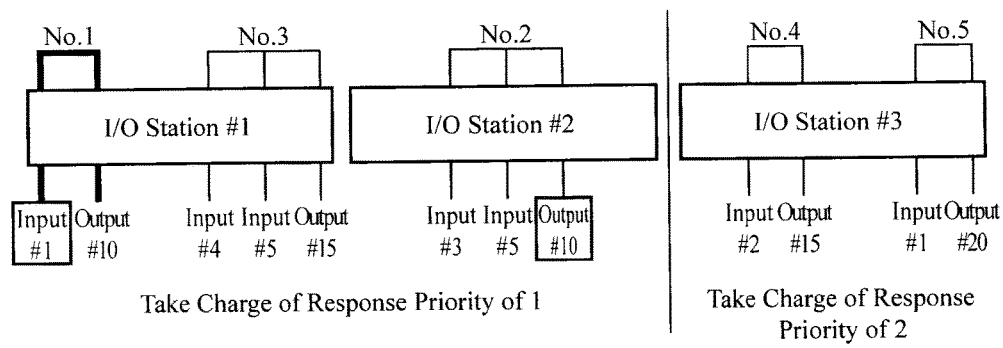

| No | Input A | | Input B | | Output C | | Operation | Response Priority |
|---|---|---|---|---|---|---|---|---|
| | Station Number | Device Name | Station Number | Device Name | Station Number | Device Name | | |
| 1 | 1 | 1 | | | 1 | 10 | OUT ▼ | 1 ▼ |
| 2 | 2 | 3 | 2 | 5 | 2 | 10 | OR ▼ | 2 ▼ |
| 3 | *3* | 5 | *3* | 4 | *3* | *25* | AND ▼ | 2 ▼ |
| 4 | 3 | 2 | | | 3 | 15 | MOV ▼ | 2 ▼ |
| 5 | 3 | 1 | | | 3 | 20 | OUT ▼ | 2 ▼ |

| No | Input A | | Input B | | Output C | | Operation | Response Priority |
|---|---|---|---|---|---|---|---|---|
| | Station Number | Device Name | Station Number | Device Name | Station Number | Device Name | | |
| 1 | 1 | 1 | | | 1 | 10 | OUT ▼ | 1 ▼ |
| 2 | 1 | 3 | 1 | 5 | 2 | 10 | OR ▼ | 2 ▼ |
| 3 | 2 | 1 | 1 | 4 | 3 | 10 | AND ▼ | 2 ▼ |
| 4 | 1 | 2 | | | 3 | 15 | MOV ▼ | 2 ▼ |
| 5 | 3 | 1 | | | 3 | 20 | OUT ▼ | 2 ▼ |

| Interchange Restriction | | |
|---|---|---|
| Station Number | Device Name | Interchangeable Station |
| 1 | 1 | Uninterchangeable with All Stations |
| 2 | 10 | Uninterchangeable with All Stations |
| 1 | 4 | 2 |

| No | Input A | | Input B | | Output C | | Operation | Response Priority |
|---|---|---|---|---|---|---|---|---|
| | Station Number | Device Name | Station Number | Device Name | Station Number | Device Name | | |
| 1 | 1 | 1 | | | 1 | 10 | OUT ▼ | 1 ▼ |
| 2 | *2* | 3 | *2* | 5 | 2 | 10 | OR ▼ | 2 ▼ |
| 3 | 2 | 1 | *2* | 4 | *2* | *15* | AND ▼ | 2 ▼ |
| 4 | *3* | 2 | | | 3 | 15 | MOV ▼ | 2 ▼ |
| 5 | 3 | 1 | | | 3 | 20 | OUT ▼ | 2 ▼ |

| No | Input A | | Input B | | Output C | | Operation | Response Priority |
|----|---------|---|---------|---|----------|---|-----------|-------------------|
|    | Station Number | Device Name | Station Number | Device Name | Station Number | Device Name | | |
| 1 | 1 | 1 |   |   | 1 | 10 | OUT ▼ | 1 ▼ |
| 2 | 1 | 3 | 1 | 5 | 2 | 10 | OR ▼  | 2 ▼ |
| 3 | 2 | 1 | 1 | 4 | 3 | 10 | AND ▼ | 2 ▼ |
| 4 | 1 | 2 |   |   | 3 | 15 | MOV ▼ | 2 ▼ |
| 5 | 3 | 1 |   |   | 3 | 20 | OUT ▼ | 2 ▼ |

| Interchange Restriction | | | |
|---|---|---|---|
| Interchange Device Restriction | | | Non-Use I/O Station Restriction |
| Station Number | Device Name | Interchangeable Station | |
| 1 | 1 | Uninterchangeable with All Stations | 1 |
| 2 | 10 | 3 | |
|   |   |   | |

| No | Input A | | Input B | | Output C | | Operation | Response Priority |
|----|---------|---|---------|---|----------|---|-----------|-------------------|
|    | Station Number | Device Name | Station Number | Device Name | Station Number | Device Name | | |
| 1 | *2* | 1 |   |   | *2* | 10 | OUT ▼ | 1 ▼ |
| 2 | *3* | 3 | *3* | 5 | *3* | *25* | OR ▼  | 2 ▼ |
| 3 | *3* | *2* | *3* | 4 | 3 | 10 | AND ▼ | 2 ▼ |
| 4 | *3* | *6* |   |   | 3 | 15 | MOV ▼ | 2 ▼ |
| 5 | 3 | 1 |   |   | 3 | 20 | OUT ▼ | 2 ▼ |

INPUT/OUTPUT RESPONSE CONTROL SETTING DEVICE

FIELD OF THE INVENTION

The present invention relates to an input/output response control setting device that determines candidates for change of the setting of input/output response control in control equipment that controls FA (Factory Automation) devices and lines.

BACKGROUND OF THE INVENTION

FA equipment that controls FA devices is comprised of a plurality of units including a controller unit that performs arithmetic operations on the basis of a control program, an input unit that is connected to pieces of input equipment, such as an external switch and an external sensor, and that receives ON/OFF signals of those pieces of equipment as input signals, and an output unit that is connected to pieces of output equipment, such as an actuator and a relay, and that outputs output signals to them. Input/output units have memory data therewithin in order to manage their respective input/output signal data, and variables for identifying the input/output signal data held in these memory data are referred to as devices. A control operation is performed while data are transmitted and received among these units via a system bus and/or a field network in each of user program execution cycles.

In an input/output unit, an input/output response between different input/output stations (referred to as I/O stations from here on) is implemented by performing communications between the I/O stations. As an access method for use in this input/output response control, for example, there is a token passing ring access method. According to this method, transmission lines each connecting between I/O stations are connected in a ring shape, special data showing a transmission right which is referred to as a token is transmitted onto the transmission line and to the I/O stations while it is made to circulate around the ring in one direction, and only the I/O station having the transmission right performs transmission.

The time which has elapsed until the next transmission right is acquired and data transmission is performed after an I/O station has transmitted data in communications between I/O stations is referred to as the communication cycle time.

Further, a distributed input/output response control technique of, for the purpose of providing an improvement in the speed of an input/output response, making an I/O station itself perform input/output response control in an autonomous distributed way without having to use control by a management controller is implemented. Although even an input/output response which is closed within an I/O station has been conventionally controlled via a management controller, the management and control of the input/output response by the I/O station itself can provide a response which is speeded up by such an extent that the control is not performed via the management controller. Because also in an input/output response between I/O stations, control is performed without performing this control via a management controller, the communication cycle time can be shortened by such an extent and hence the response can be speeded up. Further, each I/O station has an arithmetic operation function, and can perform, for example, an AND operation, an OR operation, a register comparison operation, or the like on a plurality of input devices. Each of these input/output arithmetic operations can be implemented by performing communications also between different I/O stations.

In the distributed input/output response control, the communications between I/O stations can be grouped. According to this grouping method, I/O stations having an input/output response relation are registered as a group, and control is performed in such a way that a token virtually circulates around only within each group. Because through the grouping, the I/O network can be can divided virtually and the number of I/O stations within which one token circulates around can be reduced, the communication cycle time can be shortened.

For example, patent reference 1 discloses a method of paying an attention to the control cycle of each I/O station in order to implement a high speed input/output response in these input/outputs response control operations. In accordance with the method disclosed in this patent reference 1, each I/O station adjusts the cycle of acquiring the right of data transmission according to the value of the control cycle thereof, and an I/O station that performs control in a high-speed cycle acquires a transmission right frequently, thereby reducing the communication cycle time of an I/O station which needs a high speed response to a short one.

RELATED ART DOCUMENT

Patent Reference

Patent reference 1: Japanese Unexamined Patent Application Publication No. 2000-284812

SUMMARY OF THE INVENTION

Problems to be Solved by the Invention

Conventionally, for the purpose of providing an improvement in the speed of a response in input/output response control, the communication cycle time of each I/O station is reduced to a short one by using the technique described in patent reference 1, or the like. However, in the distributed input/output response control method, how an input/output response relation in which input/output response control is completed within an I/O station is defined while avoiding communications between I/O stations, rather than the shortening of the communication cycle time of each I/O station, contributes to the shortening of the response time. A problem with the distributed input/output response control method is therefore that the shortening of the response time is insufficient only by using the technique disclosed by patent reference 1.

Further, in the distributed input/output response control method, the resource of each I/O station also has an influence on the response time. More specifically, there is a possibility that input and output signal control to be processed increases and hence the response time increases with increase in the number of input/output devices on which each I/O station performs response control. It is therefore desirable that in order to allocate a large amount of I/O station resource to a response between input/output devices which need a high speed response, other input/output response control is not allocated to an I/O station which manages the above-mentioned input/output response. However, there is a possibility that because optimization for each input/output device is not performed in the conventional input/output response control represented by patent reference 1, when response control between input/output devices which need a high speed response is allocated to an I/O station which performs a large number of input/output response control operations, a response between the above-mentioned input/output devices cannot be implemented in a desired time.

A setting of these input/output response relations is performed by the user itself, by way of a system bus and/or a field network, on an engineering tool connected to a plurality of units which construct FA equipment. The user specifies one or more I/O stations and one or more device names of input devices, and also specifies an operation at the time of output, such as an AND operation, an OR operation, or a register comparison operation, for those input devices. In addition, the user specifies an I/O station and a device name of an output device, and defines an input/output response relation between these input devices and the output device. In this setting of input/output response relations, when, for example, 64 devices for input/output are provided for each of 32 I/O stations, it is necessary to define 2,048 response relations at maximum, and only the setting of desired input/output response relations requires a complicated setting.

A further problem with these input/outputs response control settings is that it is difficult for the user to, while taking into consideration physical restrictions such as an arrangement of sensors, perform a setting operation of avoiding unnecessary communications between I/O stations, and further adjusting allocation of devices to each I/O station in such a way that a larger amount of I/O station resource is allocated to devices which need a high speed response.

The present invention is made in order to solve the above-mentioned problems, and it is therefore an object of the present invention to provide an input/output response control setting device that changes the setting of input/output response relations inputted by a user in such a way that the setting is a one in which the response time required for each input/output response is shortened.

Means for Solving the Problem

In accordance with the present invention, there is provided an input/output response control setting device including: an input/output response relation data storage that, for I/O stations each having devices each of which inputs or outputs data, stores input/output response relations in each of which an I/O station for input and its devices and an I/O station for output and its devices are defined; an interchange searcher that extracts an input/output response relation in which the I/O station for input differs from the I/O station for output from the input/output response relations stored in the input/output response relation data storage, and that searches for an interchange candidate with which to make the I/O station for input and the I/O station for output in the above-mentioned extracted input/output response relation be the same as a result of interchanging either or both of the above-mentioned I/O station for input and the above-mentioned I/O station for output with another I/O station or other I/O stations; and an interchanger that interchanges a definition of an I/O station and its devices in the above-mentioned input/output response relation extracted by the interchange searcher with that of an I/O station, which is the interchange candidate, and its devices.

Advantages of the Invention

Because the input/output response control setting device in accordance with the present invention changes the definition of an input/output response relation in which the I/O station for input differs from the I/O station for output, and which needs communications between the I/O stations so as to make the I/O station for input and the I/O station for output be the same, the input/output response can be completed within the I/O station and the communications between the I/O stations can be avoided as much as possible, and the setting can be changed to a one in which the response time required for the input/output response is shortened.

BRIEF DESCRIPTION OF THE FIGURES

FIG. 1 is a block diagram showing the configuration of an input/output response control setting device in accordance with Embodiment 1 of the present invention;

FIG. 2 is a diagram showing an input/output response setting screen in an initial state which is displayed by the input/output response control setting device in accordance with Embodiment 1;

FIG. 3 is a diagram showing a state after a user's input of the input/output response setting screen shown in FIG. 2;

FIG. 6 is a diagram showing an interim state of change of the setting of the input/output response setting screen shown in FIG. 3;

FIG. 7 is a diagram showing a correspondence on an I/O network, which is associated with the input/output response setting screen shown in FIG. 6;

FIG. 8 is a diagram showing an example of what response priority each I/O station takes charge of;

FIG. 11 is a diagram showing an input/output response setting screen after a user's input which is displayed by an input/output response control setting device in accordance with Embodiment 2;

FIG. 12 is a diagram showing a state in which the change of the setting of the input/output response setting screen shown in FIG. 11 is completed;

FIG. 13 is a diagram showing an input/output response setting screen after a user's input which is displayed by an input/output response control setting device in accordance with Embodiment 3;

FIG. 14 is a diagram showing a state in which the change of the setting of the input/output response setting screen shown in FIG. 13 is completed;

EMBODIMENTS OF THE INVENTION

Figure 4:
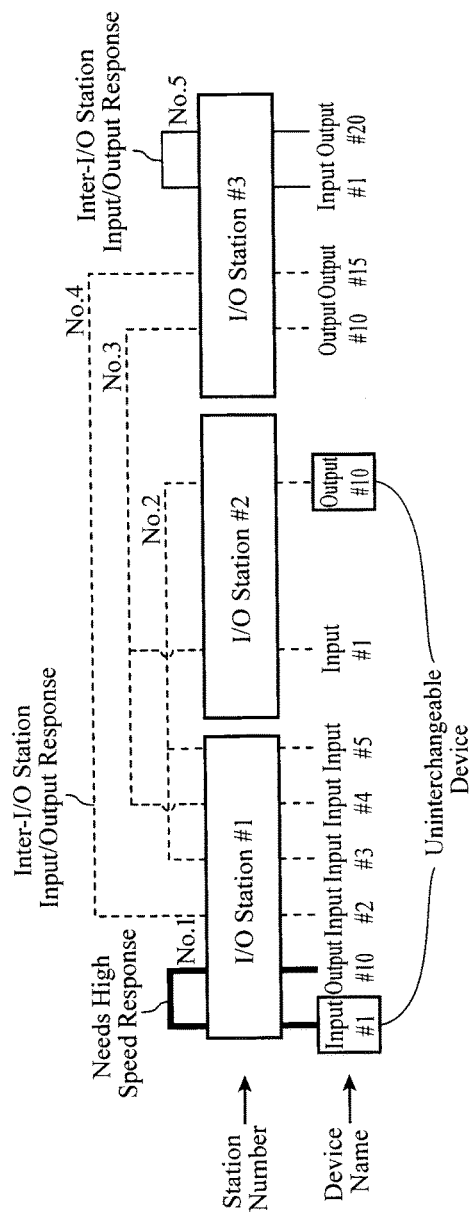
FIG. 4 is a diagram showing a correspondence on an I/O network which is associated with the input/output response setting screen shown in FIG. 3.

Hereafter, in order to explain this invention in greater detail, the preferred embodiments of the present invention will be described with reference to the accompanying drawings.

Embodiment 1

As shown in FIG. 1, an input/output response control setting device 1 in accordance with this Embodiment 1 is comprised of an input unit 2, a display 3, a controller 4, an input/output response relation data storage 5, a response priority data storage 6, an interchange restriction data storage 7, a resource allocator 8, an interchange searcher 9, and an interchanger 10. This input/output response control setting device 1 changes an input/output response relation set for an I/O station of distributed input/output response control type in such a way that a response time is shortened, and presents the input/output response relation to a user.

The input unit 2 accepts information necessary for a change of the setting of an input/output response of an I/O station from a user, and outputs the information to the controller 4. The display 3 displays the setting of an input/output response which the user inputs and displays a result of having changed the setting according to screen data inputted from the controller 4. The controller 4 performs a process of inputting data from the input unit 2, a process of outputting the screen data to the display 3, and a process of writing data into and reading data from the input/output response relation data storage 5, the response priority data storage 6, and the interchange restriction data storage 7.

As information necessary for change of the setting of an input/output response, there are input/output response relation data that define a relation between an I/O station used for input of data and devices, and a relation between an I/O station used for output of the above-mentioned data and devices, response priority data set for each input/output response relation, and interchange restriction data about I/O stations and devices.

The input/output response relation data specifies the operations of an input device, an output device, and an input device at the time of output. The controller 4 stores the input/output response relation data inputted from the input unit 2 in the input/output response relation data storage 5.

The response priority data are configured to specify values for input/output response relations in such a way that a higher priority is assigned to an input/output response relation which needs a higher speed response. The controller 4 stores the response priority data inputted from the input unit 2 in the response priority data storage 6.

The interchange restriction data are configured to specify input or output devices each of which cannot be interchanged with an input or output device of another I/O station because of a factor including a physical restriction such as a switch for connection. The controller 4 stores the interchange restriction data inputted from the input unit 2 in the interchange restriction data storage 7.

FIG. 2 is a diagram showing an input/output response setting screen 20 in an initial state which is displayed by the display 3. The user inputs necessary information from the input unit 2 while looking at the input/output response setting screen 20 displayed on the display 3. In the example of FIG. 2, the user inputs, as the definition (input A or B) of each input device, the station number of an I/O station to which this input device is allocated, and the name of this input device. Although up to the two channels: the inputs A and B can be specified in the example shown in FIG. 2, a larger number of input devices can be specified. As the definition (output C) of each output device, the user inputs the station number of an I/O station to which this output device is allocated, the name of this output device, and an operation. As the definition of the operation, for example, an operation, corresponding to the output, on the input devices, such as a 1-bit copy operation (OUT), a register copy operation (MOV), a 2-input AND operation (AND), and a 2-input OR operation (OR), is specified. As each response priority, a value according to the response speed necessary for the input/output response relation of a specified No. is inputted. For example, numerical values, such as 1, 2, and 3, characters, such as high, middle, and low, or response times themselves can be set to the response priorities in order of descending priority. Further, as interchange restrictions (uninterchangeable devices), the station numbers and the device names of I/O stations to each of which an input or output device which cannot be moved because of physical restrictions or the like is allocated are inputted.

FIG. 3 is a diagram showing an input/output response setting screen 21 after the user's input which is displayed by the display 3. In FIG. 4, a correspondence on an I/O network is illustrated about the input/output response relations, the response priorities, and the interchange restrictions which are set in the example of FIG. 3. In FIG. 4, both devices connected via a solid line show an input/output response relation which is closed in an I/O station, and both devices connected via each broken line show an input/output response relation which needs communications between I/O stations. Further, both devices connected via a thick line show an input/output response relation which needs a high speed response. In addition, each device name enclosed by a square shows a device on which an interchange restriction of disabling the device to be interchanged with another device is imposed.

In FIG. 4, for all the I/O stations of station numbers 1 to 3 (#1 to #3), only the names (input #1, output #10, etc.) of the devices to each of which an input/output response relation is set are illustrated, but available devices to each of which no input/output response relation is set are not illustrated.

Hereafter, by using, as an example, a case in which the setting of the input/output responses shown in FIGS. 3 and 4 is changed, a flow of the operation of the input/output response control setting device 1 will be explained.

Figure 5:
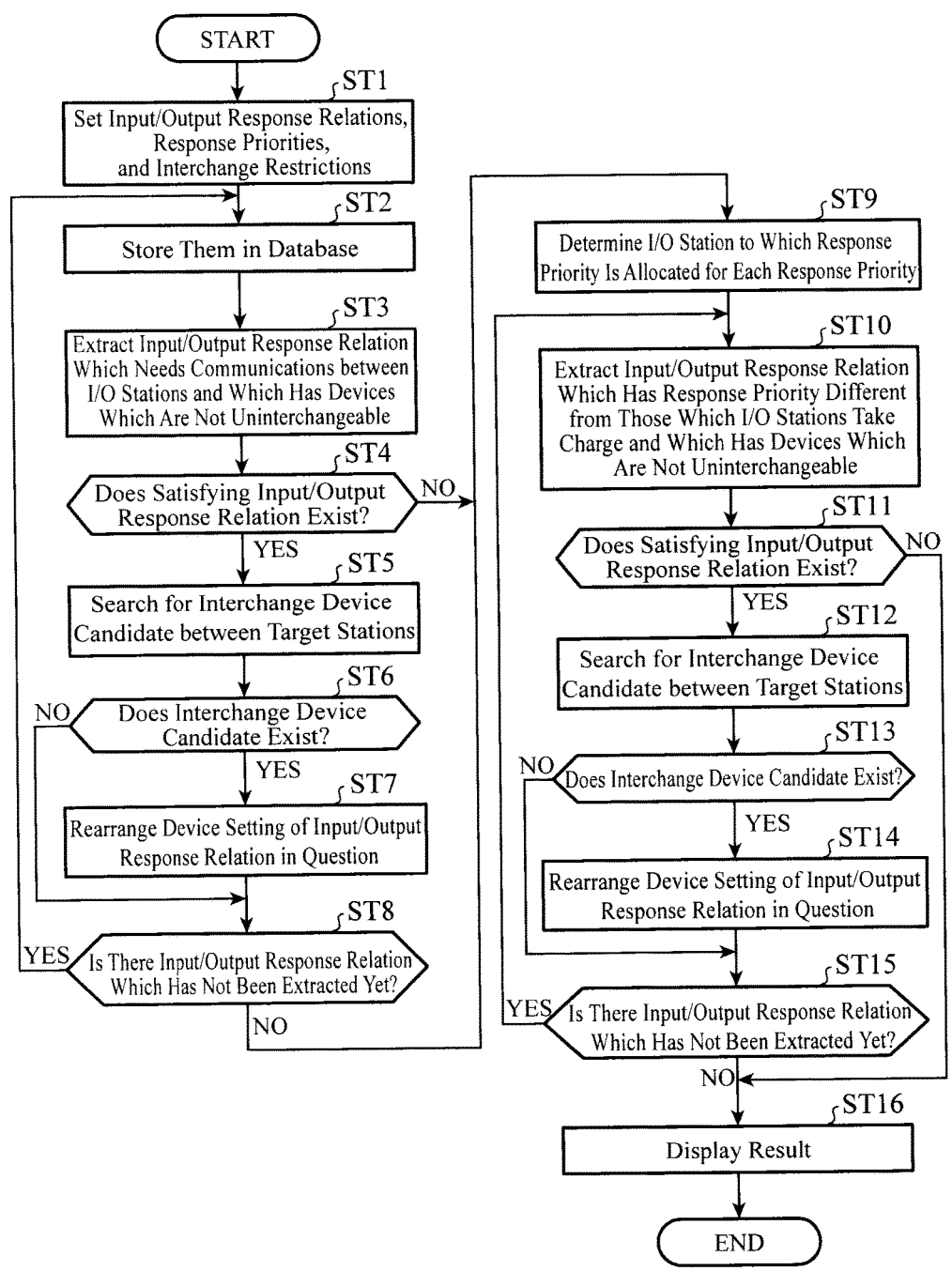
FIG. 5 is a flow chart showing the operation of the input/output response control setting device in accordance with Embodiment 1.

FIG. 5 is a flow chart showing the operation of the input/output response control setting device 1.

When the input/output response relation data, the response priority data, and the interchange restriction data are, in step ST1, inputted to the input unit 2, the controller 4, in step ST2, stores these data in the input/output response relation data storage 5, the response priority data storage 6, and the interchange restriction data storage 7, respectively.

Next, the interchange searcher 9, in step ST3, extracts an input/output response relation which needs communications between I/O stations and in which neither each input device nor the output device is uninterchangeable (i.e., both each input device and the output device can be interchanged) from the input/output response relations stored in the input/output response relation data storage 5. Whether or not to need communications between I/O stations can be determined by, for example, comparing between the station numbers specified as the inputs A and B, and the station number specified as the output C, and, when the station numbers of the inputs A and B differ from that of the output C, communications between I/O stations are needed.

In the case of the example shown in FIGS. 3 and 4, the interchange searcher 9 determines, for each of the input/output response relations No. 2 to No. 4, that the input/output response relation needs communications between I/O stations. Further, the interchange searcher 9 determines, for each of the input/output response relations No. 1 to No. 5, that the input/output response relation is a one in which neither each input device nor the output device is registered as an uninterchangeable device. Therefore, the input/output response relations each of which satisfies both of the above-mentioned conditions are the ones No. 2 to No. 4.

When there is an input/output response relation which satisfies the conditions of step ST3 (when "YES" in step ST4), the interchange searcher 9, in next step ST5, searches through the devices, in the I/O stations to which the satisfying input/output response relation is set, which are used for other input/output response relations, for a device which can eliminate the communications between I/O stations when interchanged with a device used in the satisfying input/output response relation, as an interchange device candidate. When there is no such interchange device candidate, the interchange searcher 9 searches for an available device which is not used in the I/O stations to which the satisfying input/output response relation is set as an interchange device candidate.

For example, when there are an input/output response relation in which a device of the I/O station #1 is set as an input and a device of the I/O station #2 is set as an output and an input/output response relation in which a device of the I/O station #2 is set as an input and a device of the I/O station #1 is set as an output, and there are no interchange restrictions, the input device of the I/O station #1 and the input device of the I/O station #2, or the output device of the I/O station #1 and the output device of the I/O station #2 are determined as interchange device candidates.

When there are interchange device candidates with each of which an interchange can be performed between the target stations (when "YES" in step ST6), the interchanger 10 selects one interchange device candidate from these interchange device candidates, and changes the setting (step ST7). In the case of the above-mentioned example, by, for example, interchanging the input device of the I/O station #1 and the input device of I/O station #2, an interchange is performed in such a way that the input device and the output device of the I/O station #1 have an input/output response relation and the input device and the output device of the I/O station #2 have an input/output response relation.

The controller 4 updates the input/output response relation data changed by the interchanger 10 among the input/output response relation data stored in the input/output response relation data storage 5.

When there is no interchange device candidate (when NOT in step ST6), the interchange searcher 9 checks the presence or absence of an input/output response relation which has not been extracted yet (step ST8). When there is an input/output response relation which has not been extracted yet (when "NO" in step ST8), the interchange searcher 9 extracts again an input/output response relation which needs communications between I/O stations and in which neither each input device nor the output device is uninterchangeable (step ST3).

In contrast, when there is no input/output response relation satisfying the conditions of step ST3 (when "NO" in step ST4), or when the determination of whether each of all the input/output response relations satisfies the conditions is completed (when "YES" in step ST8), the interchange searcher 9 advances to a process of next step ST9.

In the case of the example shown in FIGS. 3 and 4, the interchange searcher 9 and the interchanger 10 repeatedly search through the input/output response relations No. 2 to No. 4 which need interchange for an interchange device candidate which can be interchanged between the target stations and repeatedly change the setting of the above-mentioned candidate, respectively (steps ST5 to ST8).

An interim state of an input/output response setting screen 22 in which the setting of the input/output response relations shown in FIG. 3 is changed is shown in FIG. 6. Station numbers or device names each expressed by an underlined thick character are the ones on which the change of the setting is performed through the processes of steps ST3 to ST8. Further, in FIG. 7, a correspondence on the I/O network is illustrated about the input/output response relations changed in the example shown in FIG. 6.

In the change example shown in FIGS. 6 and 7, the device of the input A and the device of the input B in the input/output response relation No. 2 are changed from the devices of the station number 1 to devices of the station number 2. Further, also in each of the input/output response relations No. 3 and No. 4, the allocation of devices is changed in such a way that the station numbers set to the inputs A and B are the same as the station number set to the output C. This change causes the inputs A and B and the output C to be completed within the same I/O station and eliminates the communications between I/O stations in each of all the input/output response relations No. 1 to No. 5.

By performing the changing process of up to step ST8, each input/output response can be completed within an I/O station, and communications between I/O stations can be avoided as much as possible. Therefore, although this stage is in the course of the changing process, the input/output response setting screen 22 in this stage can be presented to the user as a result of having changed the setting in which the response time required for each input/output response is shortened.

Continuously, the changing process will be explained.

When the change of the input/output response relations which eliminates communications between I/O stations is completed in steps ST3 to ST8, the resource allocator 8 then, in step ST9, determines, for each I/O station, a response priority of which the I/O station takes charge on the basis of the response priorities stored in the response priority data storage 6 in such a way that a larger amount of I/O station resource is allocated to a device having a higher response priority (i.e., a device which needs a higher speed response).

For example, when the number of I/O stations is six, and each of the response priorities of the input/output response relations is 1, 2, or 3 and the smaller value of the response priority the higher the response priority is, the resource allocator 8 selects three I/O stations each of which takes charge of an input/output response relation having the response priority of 1, two I/O stations each of which takes charge of an input/output response relation having the response priority of 2, and one I/O station which takes charge of an input/output response relation having the response priority of 3 from the six I/O stations. As a result, an input/output response having a higher response priority is taken charge of by a larger number of I/O stations, and has a larger amount of resource allocated thereto. Further, in a case in which there is an I/O station that performs communications between I/O stations, this I/O station is made to take charge of an input/output response relation having a low response priority.

An example of what response priority each I/O station takes charge of in the example shown in FIGS. 6 and 7 is shown in FIG. 8. In the example shown in FIGS. 6 and 7, because the response priorities are set to have two levels of 1 and 2, the number of I/O stations each of which takes charge of the response priority of 1 is two and the number of I/O stations each of which takes charge of the response priority of 2 is one among the three I/O stations. The resource allocator 8 determines the I/O station #1 to which the input/output response relation No. 1 having the response priority of 1 is allocated as the one which takes charge of the response priority of 1. The resource allocator further determines also the I/O station #2 as the one which takes charge of the response priority of 1, and determines the I/O station #3 as the one which takes charge of the response priority of 2. Either one of the I/O stations #2 and #3 can be made to take charge of the response priority of 1.

There is a case in where there remains an input/output response relation in which communications between I/O stations are not eliminated due to a physical restriction or the like even if the changing process of steps ST3 to ST8 is performed. At this time, when an input/output response relation which has the same response priority as the remaining I/O station input/output response relation and which does not need communications between I/O stations is allocated to an I/O station to which the above-mentioned remaining I/O station input/output response relation is allocated, the response priority of the above-mentioned remaining I/O station input/output response relation is lowered by one level and the allocation is changed to an I/O station which takes charge of a lower response priority. In contrast, when such an input/output response relation as above is not allocated to an I/O station to which the remaining I/O station input/output response relation is allocated, the response priority of the above-mentioned remaining I/O station input/output response relation is maintained.

By doing in this way, even when the performance of a response for which communications between I/O stations are eliminated degrades, a reduction of the response performance of an input/output response relation having the same response priority as an input/output response relation which needs communications between I/O stations can be prevented. Further, by lowering the response priority by one level, the relation in response priority between the above-mentioned input/output response relation which needs communications between I/O stations and other input/output response relations is not reversed.

Next, the interchange searcher 9, in step ST10, extracts an input/output response relation which has a response priority different from the response priorities of which the I/O stations take charge and in which all of the input devices and the output device are not uninterchangeable from the input/output response relations stored in the input/output response relation data storage 5.

When there is an input/output response relation satisfying the condition of step ST10 (when "YES" in step ST11), the interchange searcher 9, in next step ST12, searches through the I/O stations each of which takes charge of the response priority set to the satisfying input/output response relation for one of available devices of an I/O station having the smallest number of devices allocated thereto, i.e., having the largest remaining amount of resource, as an interchange device candidate.

When there is an interchange device candidate which can be interchanged between the target stations (when "YES" in step ST13), the interchanger 10 changes the setting of the input/output response relation satisfying the condition of step ST10 with the interchange device candidate (step ST14).

The controller 4 updates the input/output response relation data changed by the interchanger 10 among the input/output response relation data stored in the input/output response relation data storage 5.

When there is no interchange device candidate (when "NO" in step ST13), more specifically, when there is no available device in an I/O station which takes charge of the response priority set to the input/output response relation satisfying the condition of step ST10, the interchange searcher 9 checks the presence or absence of an input/output response relation which has not been extracted yet (step ST15). When there is an input/output response relation which has not been extracted yet (when "NO" in step ST15), the interchange searcher 9 extracts again an input/output response relation which has a response priority different from the response priorities of which the I/O stations take charge and in which all of the input devices and the output device are not uninterchangeable (step ST10).

In contrast, when there is no input/output response relation satisfying the condition of step ST10 (when "NO" in step ST11), or when the determination of whether each of all the input/output response relations satisfies the condition is completed (when "YES" in step ST15), the input/output response control setting device, in next step ST16, outputs screen data showing a result of the change of the input/output response setting from the controller 4 to the display 3, and the display presents the result to the user. The user actually interchanges sensors, switches, and so on which are connected to the devices of I/O stations according to the changed setting presented thereto.

Figures 9, 10:
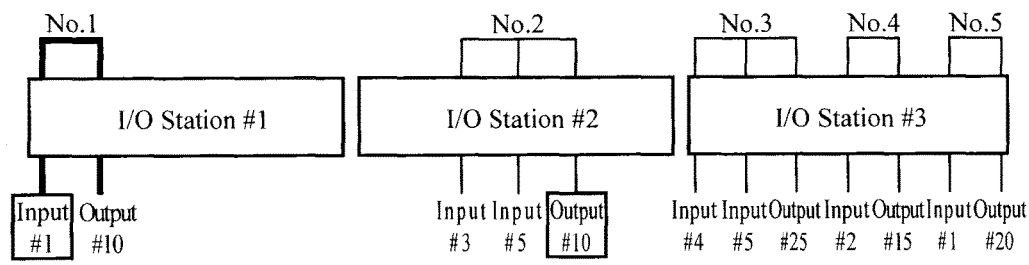
FIG. 9 is a diagram showing a state in which the change of the setting of the input/output response setting screen shown in FIG. 3 is completed.
FIG. 10 is a diagram showing a correspondence on an I/O network, which is associated with the input/output response setting screen shown in FIG. 9.

An input/output response setting screen 23 in a state in which the change of the setting of the input/output response relations shown in FIG. 3 (and in FIG. 6 showing the interim state) is completed is shown in FIG. 9. The display 3 presents the change result to the user by displaying the input/output response setting screen 23 (step ST16). Station numbers or device names each expressed by an underlined thick character are the ones on which the change of the setting is performed through the processes of steps ST10 to ST15. Further, in FIG. 10, a correspondence on the I/O network is illustrated about the input/output response relations changed in the example shown in FIG. 9.

In the change example shown in FIGS. 9 and 10, the interchange is performed in such a way that the input/output response relation No. 3 having the response priority of 2 which is allocated to the I/O station #1 which takes charge of the response priority of 1 is allocated to available devices (input devices #4 and #5, and an output device #25) of the I/O station #3 which takes charge of the response priority of 2. Through this change, all of the resources of the I/O station #1 can be allocated to the input/output response relation No. 1 which needs a high speed response. On the other hand, because the device setting of the output C in the input/output response relation No. 2 having the response priority of 2 allocated to the I/O station #2 which takes charge of the response priority of 1 cannot be changed, no interchange is performed even though the response priority does not match between them.

As mentioned above, the input/output response control setting device 1 in accordance with Embodiment 1 is configured in such away as to include: the input/output response relation data storage 5 that, for I/O stations each having devices each of which inputs or outputs data, stores input/output response relations in each of which an I/O station for input and its devices and an I/O station for output and its devices are defined; the interchange searcher 9 that extracts an input/output response relation in which the I/O station for input differs from the I/O station for output from the input/output response relations stored in the input/output response relation data storage 5, and that searches for an interchange candidate with which to make the I/O station for input and the I/O station for output in the above-mentioned extracted input/output response relation be the same as a result of interchanging either or both of the above-mentioned I/O station for input and the above-mentioned I/O station for output with another I/O station or other I/O stations; and the interchanger 10 that interchanges a definition of an I/O station and its devices in the input/output response relation extracted by the interchange searcher 9 with that of an I/O station, which is the interchange candidate, and its devices. Therefore, the input/output response control setting device can change the setting of an input/output response relation inputted by the user in such a way that the input/output response is completed within the I/O station and the communications between the I/O stations is avoided as much as possible, and can present the changed result of the setting in which the response time required for the input/output response is shortened to the user.

Further, the input/output response control setting device 1 in accordance with Embodiment 1 is configured in such a way that it includes the response priority data storage 6 that stores a response priority showing necessity for a high speed response for each of the input/output response relations, and the resource allocator 8 that determines a response priority which each of the I/O stations takes charge of, and the resource allocator 8 determines I/O stations in charge in such a way that the number of I/O stations each of which takes charge of a high response priority is larger than the number of I/O stations each of which takes charge of a low response priority, and the interchange searcher 9 extracts an input/output response relation whose response priority set thereto differs from the response priorities of which the I/O stations defined in the above-mentioned input/output response relation take charge from the input/output response relations stored in the input/output response relation data storage 5, and searches through I/O stations which take charge of the response priority set to the above-mentioned extracted input/output response relation for an interchange candidate. Therefore, the input/output response control setting device can present the changed result of the setting which allocates a larger amount of I/O station resource to an input/output response relation which needs a high speed response to the user.

Further, the input/output response control setting device 1 in accordance with Embodiment 1 is configured in such a way that it includes the interchange restriction data storage 7 that stores devices on each of which a restriction on an interchange of I/O stations is imposed, and, when searching for an interchange candidate in an input/output response relation, the interchange searcher 9 does not search for an interchange candidate for a device stored in the interchange restriction data storage 7. Therefore, the input/output response control setting device can present the changed result of the setting which takes into consideration devices on each of which a restriction on an interchange is imposed due to a physical restriction or the like to the user.

In addition, by combining the above-mentioned configurations, for the setting of an input/output response relation which is inputted by the user, the input/output response control setting device can present to the user the changed result of the setting which, while taking into consideration devices on each of which a restriction on an interchange is imposed due to a physical restriction or the like, avoids communications between I/O stations as much as possible so as to reduce the response time to a minimum, and allocates a larger amount of I/O station resource to an input/output response relation which needs a high speed response.

Embodiment 2

Because an input/output response control setting device in accordance with this Embodiment 2 has the same configuration as the input/output response control setting device 1 shown in FIG. 1 from a graphical viewpoint, the input/output response control setting device in accordance with this Embodiment 2 will be explained hereafter by using FIG. 1.

In accordance with this Embodiment 2, as interchange restriction data stored in an interchange restriction data storage 7, not only a specification of a device which cannot be interchanged with another device (above-mentioned Embodiment 1) is performed, but also a specification of a range of interchangeable I/O stations when an interchange can be performed if the I/O station is a certain one can be performed.

Hereafter, the input/output response control setting device 1 in accordance with this Embodiment 2 will be explained, focusing on a point different from that in accordance with above-mentioned Embodiment 1.

FIG. 11 is a diagram showing an input/output response setting screen 30 after a user's input which is displayed by a display 3 in accordance with Embodiment 2. The user inputs, as interchange restriction data, the station number of an I/O station to which a device which is a target for restriction is allocated, the name of the device, and the station number of an interchangeable I/O station. The example of FIG. 11 shows that while an input device #1 of an I/O station #1 and an output device #10 of an I/O station #2 cannot be interchanged with any one of all the stations, an input device #4 of the I/O station #1 can be interchanged with only a device of the I/O station #2.

Next, the operation of the input/output response control setting device 1 in accordance with this Embodiment 2 will be explained with reference to a flow chart shown in FIG. 5.

In this Embodiment 2, when it is determined, in steps ST5 and ST12 of FIG. 5, that a device specified in the interchange restriction data needs to be interchanged at the time of searching for an input/output response relation which is a target for interchange, an interchange searcher 9 searches for an interchange device candidate from the devices of I/O stations which are specified as interchangeable stations in the interchange restriction data.

Further, in accordance with this Embodiment 2, when the interchange searcher 9, in step ST12 of FIG. 5, searches for an input/output response relation which is a target for interchange, if no I/O station which takes charge of the response priority of the above-mentioned input/output response relation exists in the I/O stations specified as the interchangeable stations in the interchange restriction data, the interchange searcher determines the available devices of the I/O station having the largest remaining amount of resource, i.e., the highest ratio of available devices, among the I/O stations specified as the interchangeable stations or the candidates.

FIG. 12 shows an input/output response setting screen 31 in which the setting of the input/output response relations shown in FIG. 11 is changed, and shows a result of the change which the display 3, in step ST16, displays for the user. Station numbers or device names each expressed by an underlined thick character are the ones on which the change of the setting is performed through the processes of steps ST3 to ST15.

It is assumed that the response priorities which a resource allocator 8, in step ST9, sets to I/O stations #1 to #3 respectively are the same as those shown in FIG. 8 of above-mentioned Embodiment 1.

In FIG. 11, the setting of an input/output response relation No. 3 needs communications between I/O stations, and needs to be changed. In this input/output response relation No. 3, the device #4 of the I/O station #1 allocated to an input B can be interchanged with only a device of the I/O station #2 according to the interchange restrictions. Although because both the I/O station #2 interchangeable according to the interchange restrictions and the I/O station #1 currently being allocated to the input are I/O stations which take charge of an input/output response relation having a response priority of 1, the input can be allocated to any of the I/O stations, in the example shown in FIG. 12, the interchange searcher 9 compares the resource of the I/O station #1 with that of the I/O station #2, and changes the input/output response relation No. 3 in such a way that the input is allocated to the I/O station #2 having a larger remaining amount of resource.

Further, in FIG. 11, because the setting of each of input/output response relations No. 2 and No. 4 also needs communications between I/O stations, and uses a device of an I/O station which takes charge of a different response priority, an interchange is needed. Therefore, in FIG. 12, for each of the input/output response relations No. 2 and No. 4, communications between I/O stations are eliminated, and an interchange is performed in such a way that allocation to the I/O station which takes charge of the above-mentioned response priority is performed.

As mentioned above, the input/output response control setting device 1 in accordance with Embodiment 2 is configured in such a way that it includes the interchange restriction data storage 7 that stores devices on each of which a restriction on an interchange of I/O stations is imposed, and I/O stations in each of which an interchange of one of the above-mentioned devices with another one can be performed, and, when searching for an interchange candidate in an input/output response relation in which a device stored in the interchange restriction data storage 7 is defined, the interchange searcher 9 searches for an interchange candidate for the above-mentioned device from the interchangeable I/O stations which are stored in the interchange restriction data storage 7. Therefore, the input/output response control setting device can specify an interchange restriction condition which is closer to an actual physical restriction, and, when, for example, devices of the I/O station #1 and the I/O station #2 are interchangeable with each other, but an interchange from the I/O station #1 to the I/O station #3 cannot be performed due to a physical restriction, can present a more desirable input/output response relation which takes into consideration the interchange restriction while providing high speed response performance.

Embodiment 3

Because an input/output response control setting device in accordance with this Embodiment 3 has the same configuration as the input/output response control setting device 1 shown in FIG. 1 from a graphical viewpoint, the input/output response control setting device in accordance with this Embodiment 3 will be explained hereafter by using FIG. 1.

In this Embodiment 3, as interchange restriction data stored in an interchange restriction data storage 7, not only a specification of a device which cannot be interchanged with another device (above-mentioned Embodiment 1) and a specification of a range of interchangeable I/O stations when an interchange can be performed if the I/O station is a certain one (above-mentioned Embodiment 2) are performed, but also a specification of a non-use I/O station to which no input/output response relation is allocated can be performed.

Hereafter, the input/output response control setting device 1 in accordance with this Embodiment 3 will be explained, focusing on a point different from those in accordance with above-mentioned Embodiments 1 and 2.

FIG. 13 is a diagram showing an input/output response setting screen 40 after a user's input which is displayed by a display 3 in accordance with Embodiment 3. The user inputs, as interchange restriction data, the station number of an I/O station on which no allocation is performed (i.e., a non-use I/O station), in addition to inputting the station number of an I/O station to which a device which is a target for restriction is allocated, the name of the device, and the station number of an interchangeable I/O station. In the example of FIG. 13, the user sets an I/O station #1 to be a non-use I/O station to which no input/output response relation is allocated.

Next, the operation of the input/output response control setting device 1 in accordance with this Embodiment 3 will be explained with reference to the flow chart shown in FIG. 5.

In accordance with this Embodiment 3, when, in step ST3 of FIG. 5, extracting an input/output response relation which needs communications between I/O stations and in which neither each input device nor the output device is uninterchangeable (i.e., both each input device and the output device can be interchanged), an interchange searcher 9 also extracts, in addition to these conditions, an input/output response relation allocated to an I/O station specified as a non-use I/O station in the interchange restriction data.

When there is a setting, in the interchange restriction data, in which there is a contradiction between an interchange device restriction and a non-use I/O station restriction, a higher priority is given to the non-use I/O station restriction. In the example of FIG. 13, although a device #1 is set to be uninterchangeable in a non-use I/O station #1, a higher priority is given to the non-use I/O station restriction. Therefore, for the device #1 of the I/O station #1, an interchange device candidate with another I/O station is searched for in steps ST5 to ST8.

Further, in accordance with this Embodiment 3, when, in step ST9 of FIG. 5, setting what response priority each I/O station takes charge of, a resource allocator 8 configures that an I/O station specified as a non-use I/O station in the interchange restriction data does not take charge of any response priority.

In addition, in accordance with this Embodiment 3, when, in step ST10 of FIG. 5, extracting an input/output response relation which is a target for change, because to an I/O station specified as a non-use I/O station in the interchange restriction data, no response priority which the I/O station takes charge of is set to the I/O station, the interchange searcher 9 determines that there is no match with the response priority of the input/output response relation allocated to the above-mentioned non-use I/O station. Therefore, the input/output response relation allocated to the above-mentioned non-use I/O station satisfies the condition of step ST10, and an interchange with another I/O station is searched for.

Further, because no response priority which the above-mentioned non-use I/O station takes charge of is set to this non-use I/O station, the input/output response relation allocated to this non-use I/O station is, in steps ST12 to ST15, never determined as an interchange device candidate.

FIG. 14 shows an input/output response setting screen 41 in which the setting of input/output response relations shown in FIG. 13 is changed, and shows a result of the change which the display 3, in step ST16, displays for the user. Station numbers or device names each expressed by an underlined thick character are the ones on which the change of the setting is performed through the processes of steps ST3 to ST15.

The response priorities which the resource allocator 8, in step ST9, sets to the I/O stations #1 to #3 are as follows. No response priority is set to the I/O station #1, a response priority of 1 is set to the I/O station #2, and a response priority of 2 is set to the I/O station #3.

In FIG. 13, the input/output response relations No. 1 to No. 4 are associated with input/output responses each of which uses devices of the I/O station #1 specified as a non-use I/O station, and any one of the relations needs to be changed. Because the response priority of 1 is set to the input/output response relation No. 1, the input/output response relation No. 1 is changed to the I/O station #2 which takes charge of the response priority of 1, as shown in FIG. 14. Further, each of the input/output response relations No. 2 to No. 4 to which the response priority of 2 is set is changed to the I/O station #3 which takes charge of the response priority of 2.

As mentioned above, the input/output response control setting device 1 in accordance with Embodiment 3 is configured in such a way that it includes the interchange restriction data storage 7 that stores non-use I/O stations each of which is not used for input and output of data, and the interchange searcher 9 extracts an input/output response relation in which a non-use I/O station stored in the interchange restriction data storage 7 is defined from the input/output response relations stored in the input/output response relation data storage 5, and searches through I/O stations other than the non-use I/O stations for an interchange candidate in the above-mentioned extracted input/output response relation. Therefore, the input/output response control setting device can specify, as an interchange restriction, an I/O station to which no input/output response relation is allocated, in addition to a range of uninterchangeable devices and a range of interchangeable I/O stations. When there is a necessity to change the setting of an input/output response relation with another I/O station, for example, when an arbitrary I/O station breaks down, the input/output response control setting device can present a more desirable input/output response relation which takes into consideration the interchange restriction while providing high speed response performance.

Embodiment 4

Figure 15:
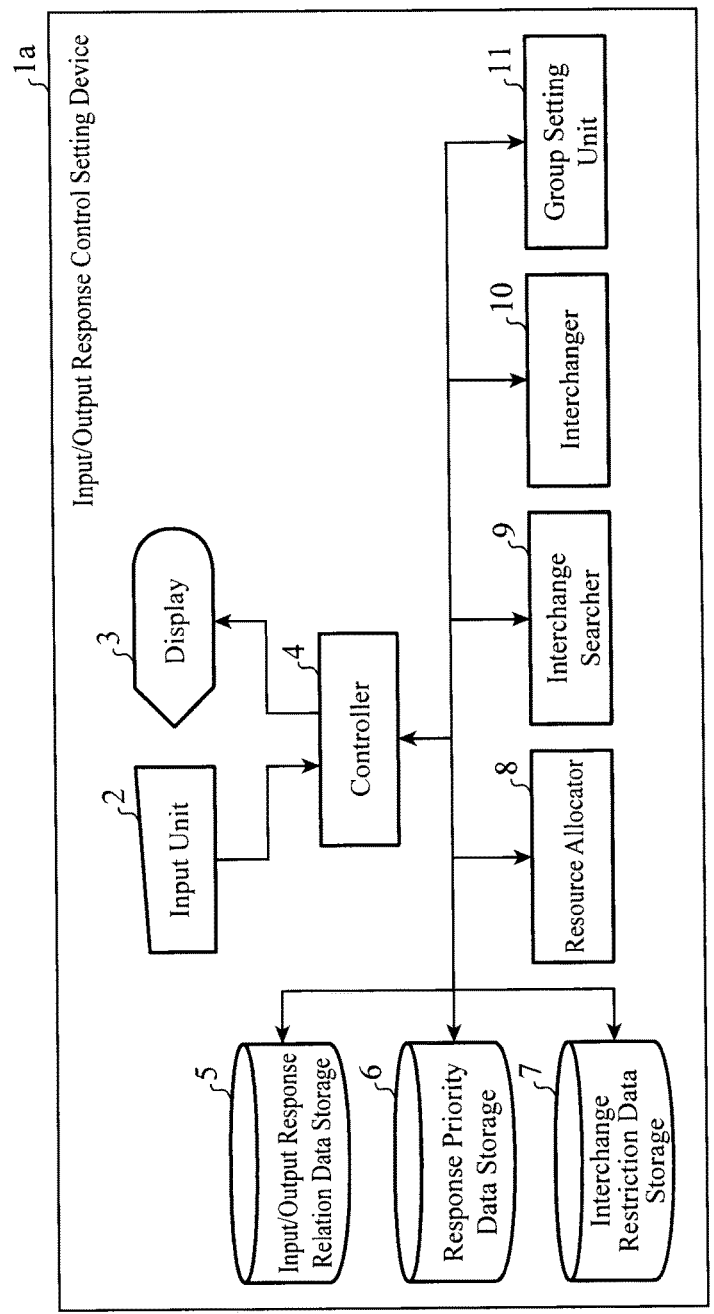
FIG. 15 is a block diagram showing the configuration of an input/output response control setting device in accordance with Embodiment 4 of the present invention.

FIG. 15 is a block diagram showing the configuration of an input/output response control setting device 1*a* in accordance with this Embodiment 4, and the same components as those of FIG. 1 or like components are designated by the same reference numerals and the explanation of the components will be omitted hereafter. The input/output response control setting device 1*a* in accordance with this Embodiment 4 includes a group setting unit 11 that performs grouping of I/O stations each of which performs communications between I/O stations, and changes the setting of input/output response relations in such a way as to reduce the communication cycle time of communications between I/O stations.

Hereafter, the operation of the group setting unit 11 of the input/output response control setting device 1*a* in accordance with this Embodiment 4 will be explained with reference to an example of an I/O network shown in FIGS. 16 and 17.

Figure 16:
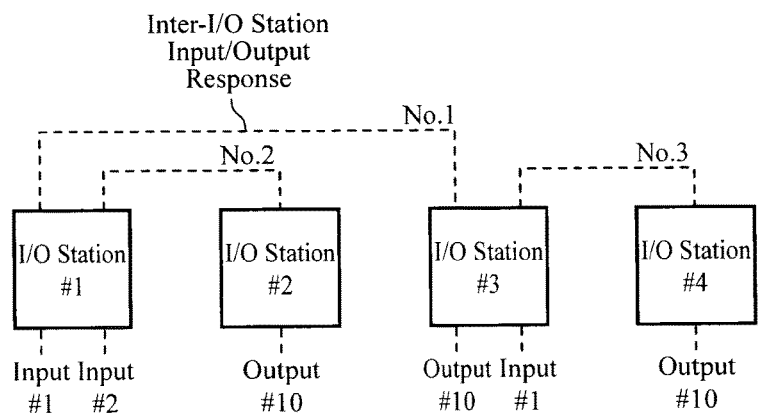
FIG. 16 is a diagram showing an example of an I/O network in which the input/output response control setting device in accordance with Embodiment 4 is a target for interchange.
Figure 17:
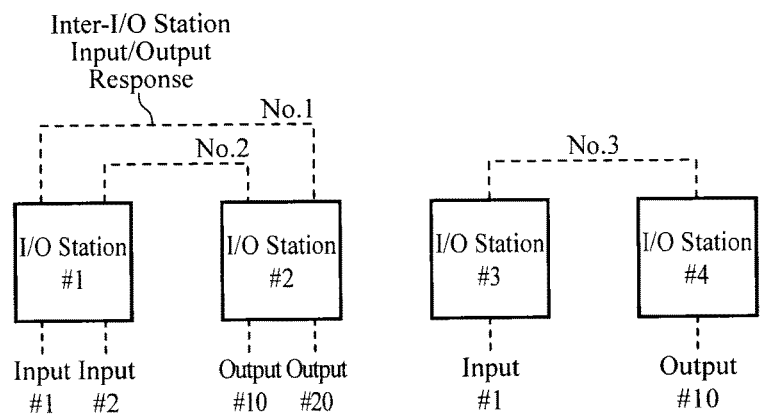
FIG. 17 is a diagram showing an example of the interchange of input/output response relations shown in FIG. 16.

FIGS. 16 and 17 show an example of an I/O network which consists of I/O stations #1 to #4, and broken lines each connecting between devices of I/O stations denote input/output response relations No. 1 to No. 3 each of which needs communications between I/O stations. The illustration of an input/output response relation closed in an I/O station is omitted.

In this Embodiment 4, it is assumed that after completion of the change of the setting of the input/output response relations in such a way as to eliminate the communications between I/O stations by using an interchange searcher 9 and an interchanger 10 (when "NO" in step ST4 of FIG. 5 or when "YES" in step ST8), the input/output response relations No to No become the ones shown in FIG. 16.

At this time, the group setting unit 11 performs a process of grouping I/O stations having an input/output response relation in which communications between the I/O stations is not eliminated due to factors such as an interchange restriction and the presence or absence of an available device. In order to, in an arbitrary I/O station, detect the existence of another I/O station which constructs the group, for example, a process of extracting another I/O station set to the input A or B, or the output C of input/output response relation data, and extracting again another I/O station set to the input A or B, or the output C of input/output response relation data in the extracted I/O station should just be repeated until no new I/O station is extracted anymore. In the example of FIG. 15, the I/O stations including from #1 to #4 are set as one group.

Next, the interchange searcher 9 searches through each group set by the group setting unit 11 for another I/O station in the same group with which the device setting of either the I/O station on an input side or the I/O station on an output side of an input/output response relation can be changed as a whole. When an I/O station satisfying this condition exists, the interchange searcher 9 further determines whether or not the group can be divided by changing the input/output response relation with the satisfying I/O station. When the group can be divided, the interchanger 10 changes the device setting of the I/O station on either one of the input and output sides of the above-mentioned input/output response relation with the satisfying I/O station as a whole.

The interchange searcher 9 and the interchanger 10 repeat the same process on all the I/O stations in each of all the groups.

An example of the change of the input/output response relations shown in FIG. 16 is shown in FIG. 17. By changing the setting of an output device #10 of the I/O station #3 with an available device #20 of the I/O station #2, as shown in FIG. 17, in the setting of the inter-I/O station input/output response relation No. 1, shown in FIG. 16, between the I/O station #1 and the I/O station #3, the group can be divided into a part about the input/output response relations No and No. 2 and a part about the input/output response relation No. 3.

Although the group setting unit 11 performs the grouping after "NO" in step ST4 or "YES" in step ST8 in the above-mentioned explanation, the group setting unit can alternatively perform the grouping after "NO" in step ST11 or "YES" in step ST15.

As mentioned above, the input/output response control setting device 1a in accordance with Embodiment 4 is configured in such a way that it includes the group setting unit 11 that sets a plurality of I/O stations connected to each other via different input/output response relations as the same group, and the interchange searcher 9 searches through I/O stations included in the same group as the input/output response relations for an interchange candidate with which to divide the group as a result of interchanging an I/O station defined in the above-mentioned input/output response relations with another I/O station. Therefore, the input/output response control setting device can perform grouping of I/O stations which need communications between I/O stations in such a way to provide groups whose sizes are reduced to as small sizes as possible. As a result, even when communication between I/O stations cannot be eliminated by the change shown in any of above-mentioned Embodiments 1 to 3, the input/output response control setting device can present a result of the change of an input/output response relation in which the response time is reduced.

Embodiment 5

Figure 18:
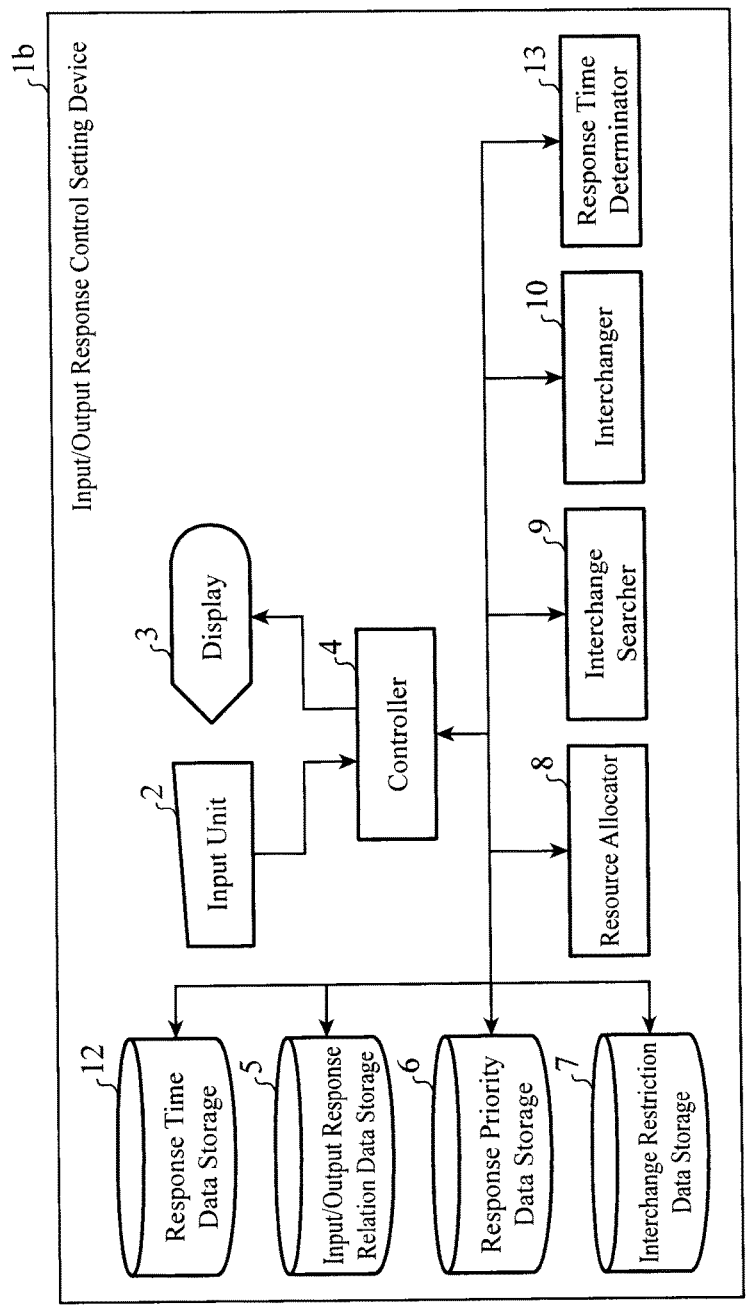
FIG. 18 is a block diagram showing the configuration of an input/output response control setting device in accordance with Embodiment 5 of the present invention.

FIG. 18 is a block diagram showing the configuration of an input/output response control setting device 1b in accordance with this Embodiment 5, and the same components as those of FIG. 1 or like components are designated by the same reference numerals and the explanation of the components will be omitted hereafter. The input/output response control setting device 1b in accordance with this Embodiment 5 includes a response time data storage 12 that stores data about a user's desired response time for each input/output response relation, and a response time determinator 13 that determines whether or not the response time of an input/output response relation after interchange meets the user's desired response time stored in the response time data storage 12.

In this Embodiment 5, the response time of an input/output response relation is calculated as shown in, for example, the following equation (1).

$$\begin{aligned}\text{response time} &= \text{processing time in } I/O \text{ station} + \\ &\quad \text{communication time between } I/O \text{ stations} = \\ &\quad \text{processing time in } I/O \text{ station} + \\ &\quad \text{sigma each } I/O \text{ station (processing time in } I/O \text{ station} + \\ &\quad \text{transmission delay in } I/O \text{ station} \times \text{retransmission count)}\end{aligned} \quad (1)$$

Because in the above equation (1) the processing time in an I/O station is predetermined for each operation for an input/output response to be processed, the response time determinator 13 should just calculate the sum of those times. As to the transmission delay and the retransmission count, their worst values in the operating environment should just be estimated and set to the response time determinator 13.

In this Embodiment 5, the user inputs a desired response time for each input/output response relation data, and this desired response time is sent from an input unit 2 and is stored in the response time data storage 12 via a controller 4.

After an interchanger 10 performs an interchange on an input/output response relation in such a way that the response time is reduced to a minimum, the response time determinator 13 estimates the response time about the input/output response relation after the interchange according to the above equation (1), compares the estimated response time with the user's desired response time stored in the response time data storage 12, and determines whether the estimated response time meets the user's desired response time. A result of the determination is displayed on a display 3 via the controller 4.

As mentioned above, the input/output response control setting device 1b in accordance with Embodiment 5 is configured in such a way as to include the response time data storage 12 in which a user's desired response time is set for each of input/output response relations, and the response time determinator 13 that estimates the response time of an input/output response relation on which the interchanger 10 has performed an interchange, and determines whether the above-mentioned estimated response time meets the user's desired response time stored in the response time data storage 12. Therefore, when presenting a result of the change of the setting of an input/output response relation which reduces the response time to a minimum to the user, the input/output response control setting device can present whether the change of the setting implements a desired response time for the user.

Although the case of applying the response time data storage 12 and the response time determinator 13 to the configuration shown in above-mentioned Embodiment 1 is shown in the above-mentioned explanation, this embodiment is not limited to this case, and the response time data storage and the response time determinator can be applied to the configuration shown in any of above-mentioned Embodiments 2 to 4.

Further, in the case in which the response times themselves, instead of values according to the speeds of response required for the input/output response relations (e.g., numerical values, such as 1, 2, and 3, or characters, such as high, middle, and low, which are set in order of descending priority), are set as response priorities stored in a response priority data storage 6, the response time determinator 13 can compare the response time stored in the response priority data storage 6 with the estimated response time, and therefore the response time data storage 12 can be eliminated.

Embodiment 6

Because an input/output response control setting device in accordance with this Embodiment 6 has the same configuration as the input/output response control setting device 1 shown in FIG. 1 from a graphical viewpoint, the input/output response control setting device in accordance with this Embodiment 6 will be explained hereafter by using FIG. 1.

In accordance with this Embodiment 6, when changing an input/output response relation allocated to I/O stations which take charge of different response priorities in such a way that the input/output response relation is allocated to I/O stations which take charge of the same response priority, an interchange searcher 9 estimates an adjacent I/O station for the above-mentioned input/output response relation and gives a high priority to an interchange with a nearer I/O station.

Hereafter, the input/output response control setting device 1 in accordance with this Embodiment 6 will be explained, focusing on a point different from that in accordance with above-mentioned Embodiment 1.

The interchange searcher 9 automatically estimates an adjacent I/O station from, for example, the designation station number of a token which circulates around an I/O network. As an alternative, the user can specify a positional relationship between I/O stations by using an engineering tool, and the interchange searcher 9 can acquire the positional relationship between I/O stations from the engineering tool and estimate an adjacent I/O station.

In accordance with this Embodiment 6, when, in step ST12 of the flow chart shown in FIG. 5, searching for an interchange device candidate between the I/O stations of an input/output response relation which is a target for change, the interchange searcher 9 automatically estimates a nearer I/O station in the above-mentioned way or estimates a nearer I/O station according to the positional relationship between I/O stations specified by the user from the I/O stations which take charge of the response priority set to the above-mentioned input/output response relation, and searches for an interchange device candidate from the available devices of the I/O station estimated thereby.

As mentioned above, the input/output response control setting device in accordance with Embodiment 6 is configured in such a way that the interchange searcher 9 estimates a positional relationship between I/O stations, and determines an I/O station adjacent to an I/O station defined in an input/output response relation as an interchange candidate on a priority basis. Therefore, the input/output response control setting device can perform change of an input/output response relation between I/O stations which are nearer to each other. As a result, the input/output response control setting device enables a user who tries to interchange sensors, switches, and so on which are actually connected to devices to reduce the work required to interchange them, and can present a result of the change of an input/output response relation which makes it possible to easily perform an interchange.

Although the case of applying the interchange searcher 9 in accordance with above-mentioned Embodiment 6 to the configuration shown in above-mentioned Embodiment 1 is shown in above-mentioned explanation, this embodiment is not limited to this case, and the interchange searcher can be applied to the configuration shown in any of above-mentioned Embodiments 2 to 5.

In addition, while the invention has been described in its preferred embodiments, it is to be understood that an arbitrary combination of two or more of the embodiments can be made, various changes can be made in an arbitrary component in accordance with any one of the embodiments, and an arbitrary component in accordance with any one of the embodiments can be omitted within the scope of the invention.

INDUSTRIAL APPLICABILITY

Because the input/output response control setting device in accordance with the present invention includes the interchange searcher that extracts an input/output response relation in which the I/O station for input differs from the I/O station for output from the input/output response relations stored in the input/output response relation data storage, and that searches for an interchange candidate with which to make the I/O station for input and the I/O station for output in the above-mentioned extracted input/output response relation be the same as a result of interchanging either or both of the above-mentioned I/O station for input and the above-mentioned I/O station for output with another I/O station or other I/O stations, and can change the setting to a one in which the response time required for the input/output response is shortened, the input/output response control setting device can be applied to control equipment that controls FA devices and lines.

EXPLANATIONS OF REFERENCE NUMERALS 1, 1a, 1b input/output response control setting device, 2 input unit, 3 display, 4 controller, 5 input/output response relation data storage, 6 response priority data storage, 7 interchange restriction data storage, 8 resource allocator, 9 interchange searcher, 10 interchanger, 11 group setter, 12 response time data storage, 13 response time determinator.

The invention claimed is:

1. An input/output response control setting device comprising:
   at least one processor configured to
   store, for I/O stations each having devices each of which inputs or outputs data, input/output response relations in each of which an I/O station for input and its devices and an I/O station for output and its devices are defined in an input/output response relation data storage;
   extract an input/output response relation in which the I/O station for input differs from the I/O station for output from the input/output response relations stored in said input/output response relation data storage;
   search for and select an interchange candidate which, if interchanged, would eliminate communication between the I/O station for input and the I/O station for output and which would also provide for communication between at least two of the devices;
   interchange a definition of an I/O station and its devices in said extracted input/output response relation with that of said selected interchange candidate and its devices; and
   display the interchanged definition of the I/O station and its devices on a display.

2. The input/output response control setting device according to claim 1, wherein said at least one processor is configured to:
   store a response priority showing necessity for a high speed response for each of said input/output response relations in a response priority data storage,
   determine said response priority which each of said I/O stations takes charge of,
   determine I/O stations in charge in such a way that a number of I/O stations each of which takes charge of a high response priority is larger than a number of I/O stations each of which takes charge of a low response priority,
   extract an input/output response relation whose response priority set thereto differs from the response priorities of which the I/O stations defined in said input/output response relation take charge from the input/output response relations stored in said input/output response relation data storage, and
   search through I/O stations which take charge of the response priority set to said extracted input/output response relation for the interchange candidate.

3. The input/output response control setting device according to claim 1, wherein said at least one processor is configured to:
   store devices on each of which a restriction on an interchange of I/O stations is imposed in an interchange restriction data storage, and when searching for the interchange candidate in an input/output response relation, not search for an interchange candidate for a device stored in said interchange restriction data storage.

4. The input/output response control setting device according to claim 1, wherein said at least one processor is configured to:
store devices on each of which a restriction on an interchange of I/O stations is imposed, and I/O stations in each of which an interchange of one of said devices with another one can be performed in an interchange restriction data storage, and
when searching for an interchange candidate in an input/output response relation in which a device stored in said interchange restriction data storage is defined, search for an interchange candidate for said device from the interchangeable I/O stations which are stored in said interchange restriction data storage.

5. The input/output response control setting device according to claim 1, wherein said at least one processor is configured to:
store non-use I/O stations each of which is not used for input and output of data an interchange restriction data storage,
extract an input/output response relation in which a non-use I/O station stored in said interchange restriction data storage is defined from the input/output response relations stored in said input/output response relation data storage, and
search through I/O stations other than said non-use I/O stations for an interchange candidate in said extracted input/output response relation.

6. The input/output response control setting device according to claim 1, wherein said at least one processor is configured to:
set a plurality of I/O stations connected to each other via different input/output response relations as same group, and
search through I/O stations included in the same group as said input/output response relations for an interchange candidate with which to divide said group as a result of interchanging an I/O station defined in said input/output response relations with another I/O station.

7. The input/output response control setting device according to claim 1, wherein said at least one processor is configured to:
set a user's desired response time for each of said input/output response relations in a response time data storage,
estimate a response time of an input/output response relation on which an interchange has been performed, and
determine whether said estimated response time meets the user's desired response time stored in said response time data storage.

8. The input/output response control setting device according to claim 1, wherein said at least one processor is configured to:
estimate a positional relationship between I/O stations, and
determine an I/O station adjacent to an I/O station defined in the input/output response relation as an interchange candidate on a priority basis.

* * * * *